United States Patent [19]
Eriksson

[11] Patent Number: 5,729,701
[45] Date of Patent: Mar. 17, 1998

[54] METHOD AND ARRANGEMENT TO CONTROL A DATA NETWORK

[75] Inventor: Mats Ebbe Eriksson, Mölndal, Sweden

[73] Assignee: Telefonaktiebolaget LM Ericsson, Stockholm, Sweden

[21] Appl. No.: 526,906

[22] Filed: Sep. 12, 1995

[30] Foreign Application Priority Data

Sep. 13, 1994 [SE] Sweden ................... 9403045

[51] Int. Cl.⁶ .................... H04L 12/40; G06F 13/362
[52] U.S. Cl. ........................ 395/290; 395/291
[58] Field of Search .................... 395/290, 285, 395/289, 291, 200.05, 200.38

[56] References Cited

U.S. PATENT DOCUMENTS 4,980,854  12/1990  Donaldson et al. .
5,297,292   3/1994  Morimoto et al. ............. 395/290

FOREIGN PATENT DOCUMENTS

| 185 370 | 6/1986 | European Pat. Off. . |
| 0 347 763 | 12/1989 | European Pat. Off. . |
| 0 385 431 | 9/1990 | European Pat. Off. . |
| 385 431 | 9/1990 | European Pat. Off. . |
| 439 987 | 8/1991 | European Pat. Off. . |
| 0 444 207 | 9/1991 | European Pat. Off. . |
| 503 323 | 9/1992 | European Pat. Off. . |
| 0 518 037 | 12/1992 | European Pat. Off. . |
| 464 554 | 5/1991 | Sweden . |

OTHER PUBLICATIONS

ITU–T Recommendation V.24, "List of Definitions for Interchange Circuits Between Data Terminal Equipment (DTE) and Data Circuit–Terminating Equipment (DCE)," Telecommunication Standardization Sector of ITU (Mar. 1993).

*Primary Examiner*—Glenn A. Auve
*Attorney, Agent, or Firm*—Burns, Doane, Swecker & Mathis, L.L.P.

[57] ABSTRACT

A method and an arrangement in a data network, comprising a centrally located master and a number of slaves connected to the master via a bus, to control, from the master, the access of the slaves to the bus. When a slave has information to send, a first signal, which implies a request for permission to send, is transferred via the bus to the master. A scanning means in the master scans for first signals from the slaves only if no slave has a permission to send and, when a first signal is found, the scanning is stopped and a second signal, implying a permission to send, is transferred via a distribution means to the slave which has requested the permission to send. The second signal is transferred to the slave only as long as the first signal is transferred from the slave to the master.

13 Claims, 1 Drawing Sheet

METHOD AND ARRANGEMENT TO CONTROL A DATA NETWORK

BACKGROUND

The present invention relates to a method and a device for arbitration in local data networks of the master/slave type where access to the bus is controlled centrally.

In existing data networks such as Ethernet, Token Ring, VME-bus etc., the users' access to the common bus of the network (arbitration) is controlled in different ways. The different networks all have in common that they strive for a control that is as simple as possible, i.e. a control that burdens the processors as little as possible and that requires few components. To ease arbitration in networks with standardised communication, there are a great number of components available on the market that can make it easier for the users to gain access to the bus without burdening the processor.

The problem is that during those occasions when it is not possible to use any of the specially adapted circuits/components, the processor load will increase. It could perhaps be possible to limit the load by means of special communication protocols, but the load on the processor will be high all the same.

In networks with a construction of the master-slave type, the arbitration is normally centralized to the master. If on top of that circuits and components that are not specially meant for protocol handling are used, the result is an increased number of operations that the processor has to perform.

European patent application EP 0 385 431 describes an example of how the arbitration can be performed in a master-slave system. In this system, the slaves are "encouraged" by the master to routinely send a demand for transmission permission so as to possibly later obtain a clear to send sign. This communication is integrated with the normal data messages on a serial bus between the slaves and the master. This relatively complicated method seems to be performed with the help of software and as such will load the central processor considerably during use.

SUMMARY

One object of the invention is thus to provide a method and an arrangement by means of which arbitration in a data network of the master-slave type can be performed in a simple manner and without loading the central processor with a noticable number of operations.

Said object is achieved according to a method where existing standardized signals are used for requesting and granting permission to send on the bus of the data network. A search is thus performed in the master for a request for permission to send from the connected slaves and when one is come across, the search is terminated and permission to send is transferred to the slave. Permission to send is however only given if no other slave at that time has permission to send, and is only given for as long as a request for permission to send is maintained.

Said object is also achieved by means of a device in which only standardized components are used for the arbitration logic. The device comprises a searching device that in the master looks for signals from the slaves that mean a request for permission to send. When such a signal is found, the search is stopped and the slave, whose request for permission to send is found, is given permission to send provided that no other permission to send is active. The permission to send is only given during the time the corresponding request for permission to send is valid.

The invention can be simplified by deriving the state of the permission to send from the request of the permission to send. In this manner, it is "automatically" determined that permission to send is only given as long as a request remains.

DETAILED DESCRIPTION

The arbitration method that constitutes the invention is suitable for, among other things, standardized transfers such as CCITT.V24. In the invention two standardized signals are used, namely the CCITT.V24 signals RTS (Request To Send) and CTS (Clear To Send) or corresponding. When a slave has data that is to be transferred to the master, a request to send (RTS) is sent to the master where it can be registered in a register. An arbitration logic exists in the master that scans the register for RTS-signals. When the arbitration logic finds a RTS, the master activates a corresponding signal for permission to send (CTS) and sends this to the calling slave that in turn starts the transmission of data. For the CTS-signal to be activated and maintained there are normally certain conditions that are in force, such as that no other CTS-signal is active, that the RTS-signal continues to be active etc.

When the slave terminates the transmission of data, it deactivates the RTS-signal. As the deactivation of the RTS signal is discovered by the master, it deactivates the corresponding CTS-signal and resumes the search for a RTS. When a new active RTS is found, the above described course of events is repeated.

To improve the safety of the arbitration method, additional conditions can be used. If for example the slave loses its CTS-signal during transmission, it should thus interrupt its transmission and deactivate its RTS-signal, whereby the master is notified that something abnormal has occured. It could also be suitable to put a time condition on the CTS-signal so that a slave, by transmission, only can block the bus for a certain time. If this time is exceeded the arbitration logic should disconnect the CTS-signal by, for example, blocking the corresponding RTS-signal.

To further explain the method, an embodiment of the method will be explained in the following with regard to a network with a master-slave layout, with references made to FIGS. 1 and 2.

Figure 1:
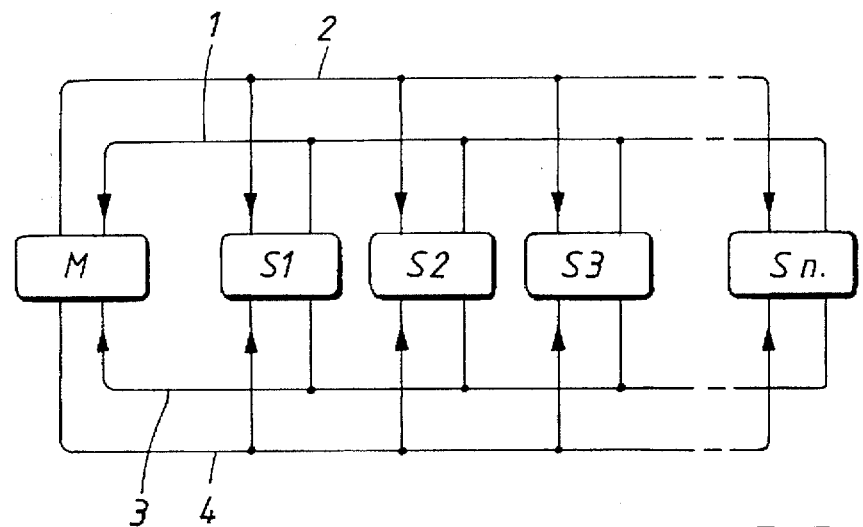
FIG. 1 shows in a block diagram form the principal construction of a network with a master and a number of slaves.

FIG. 1 shows parts of a network with a master (M) and a number (n) of slaves (S1-Sn). The master can for example be a central computer to which a number of terminals (the slaves) are connected. The master and the slaves are connected together by means of a bus, that among other things comprises an up-link for data 1, by means of which data is transferred from the slaves to the master, a down-link for data 2, by means of which data is transferred from the master to the slaves, an up-link for arbitration 3, by means of which, among other things, the RTS-signals are transferred from the slaves to the master and a down-link for arbitration 4, by means of which, among other things, the CTS-signals are transferred to the slaves from the master.

Figure 2:
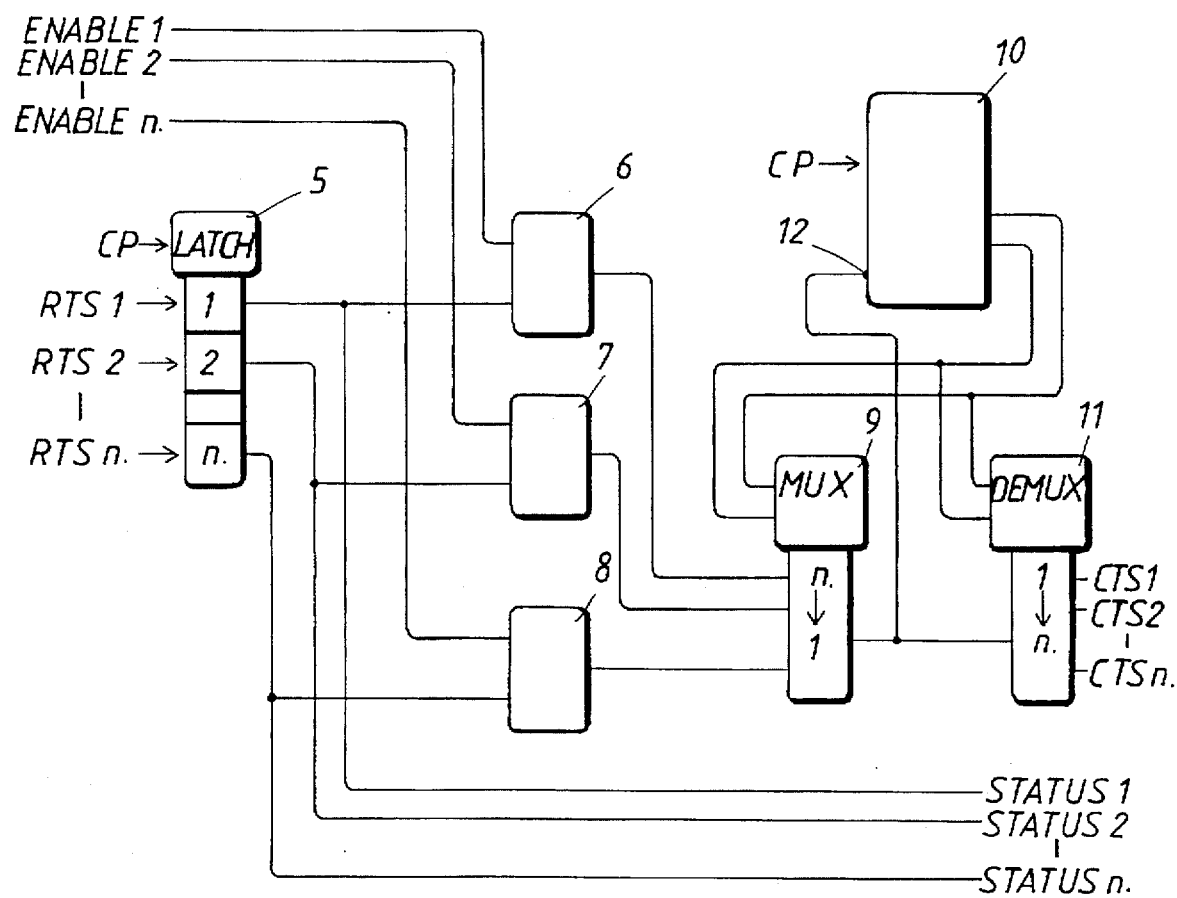
FIG. 2 shows a simplified circuit diagram of the parts of the master that are affected by a prefered embodiment of the invention.

FIG. 2 shows, in a simplified circuit diagram, those parts of the master that are affected by the arbitration method. In the drawing the references RTS1-RTSn denote the earlier mentioned RTS-signals from the slaves. When a RTS-signal from a slave is activated, it will be read into a predetermined cell in a register (LATCH) 5. The content of the register is continuously kept current by cyclically refreshing the register in pace with the clocksignal CP with regard to change on its inputs. The content of every cell in the register 5 is available to the processor of the master in the form of the signals STATUS1-STATUSn, and the content of every cell is also connected to one of the inputs of a gate circuit (AND) 6–8. An enable signal (ENABLE1-ENABLEn) from the processor of the master is connected to the other input of each gate.

The register 5 is however not always necessary—in cases where every slave has its own link, it can in principal be connected directly to the gates.

The outputs from the gates are connected to a multiplexer (MUX) 9 that transforms the n different input signals to an output signal by time multiplexing. The multiplexer is controlled by a counter 10 that counts to n in pace with the clock signal CP. The output signal from the counter is connected to the multiplexer 9 where it is used to address the inputs of the multiplexer. The output signal from the multiplexer 9 is connected to the input of a demultiplexer 11 and to an inhibit input 12 of the counter 10.

The output signal of the counter 10 is also connected to the demultiplexer 11 for dividing the output signal there from the multiplexer 9 into n different signals, referenced in FIG. 2 as CTS1-CTSn.

The function of the described device is the following: The transferred RTS-signals from different slaves are stored in the register/latch 5. Under the condition that the enable signals ENABLE1-ENABLEn have a value that means that the gates 6–8 are "open" and as such allow the passage of the RTS-signals stored in the register 5, the RTS-signals received from the slaves will exist on their own respective input of the multiplexer 9.

The counter 10 is arranged in such a way that, after having counted to n, it restarts its counting cycle. The output signal of the counter will therefore control the multiplexer in such a way that it cyclically scans its inputs. When the scan has arrived at an input where there exists a RTS-signal, it will be transferred to the output of the multiplexer and accordingly also to the inhibit input 12 of the counter. This change of state on the inhibit input will inhibit the counter and therefore the scan of the multiplexer 9 will stop.

Since the demultiplexer 11 is controlled by the same signal (the output signal of the counter 10) as the multiplexer 9, the multiplexer's scan of the inputs will be synchronous with the demultiplexer's division of its input signal. The RTS-signal that is transferred to the output of the multiplexer will therefore be distributed via the demultiplexer to an output that represents the same slave as that from which the current RTS-signal comes. The CTS-signal that is transferred to the slave via the downlink for the arbitration is thus derived from the transferred RTS-signal. Thus, it is guaranteed that the CTS-signal is deactivated as soon as the corresponding RTS-signal is deactivated.

When the slave has finished the data transmission, it deactivates the RTS-signal. The RTS-signal will then disappear from the register 5 and therefore also from the output of the multiplexer 9, the inhibit input 12 of the counter 10, and the output of the demultiplexer. The latter implies that the CTS-signal to the slave is deactivated.

When the signal on the inhibit input 12 of the counter 10 disappears, the counter will no longer be inhibited and the counting cycle will continue. The scanning of the inputs of the multiplexer 9 continues until the next RTS-signal is found, whereby the described course of events will be repeated.

Due to the fact that the arbitration logic comprising the multiplexer 9, the counter 10 and the demultiplexer 11 is constructed so that the scan is stopped as soon as a RTS-signal is found and is not started again until it is deactivated and therefore also the CTS-signal derived therefrom is deactivated, it is guaranteed that only one CTS-signal is active at a time.

Accordingly, the above described embodiment of the arbitration method does not have to have any participation of the master's processor, instead the arbitration is executed completely with the help of simple standard components (9–11).

In the description above, the enable signals ENABLE1-ENABLEn have been presumed to have a state that does not influence the course of events. By utilizing the enable signals, it is however possible to "turn off" one or more of the gates 6–8 which results in preventing the corresponding RTS-signal stored in the register 5 from reaching the multiplexer 9.

This possibility can be used in several different ways. For example, the processor of the master can use the enable signals for giving certain slaves priority over others by blocking the RTS signals from the latter. The enable signals can also be used to disconnect a RTS-signal, and consequently its corresponding CTS-signal, if a time limit has been exceeded. A further use of the enable signals is to, with the help of the gate circuits, block RTS-signals from slaves that are defective or should be locked out from the network due to another reason.

For the description of the embodiment of the arbitration method, the V24 standard was chosen as an example. It is of course possible to apply the same method in other transferrals where messages/signals corresponding to RTS and CTS are used and where the arbitration is controlled centrally.

The foregoing description should therefore be seen as an example of different embodiments of the invention. The invention is however not restricted to the above-described embodiments, but can be varied within the scope of the appended claims.

What is claimed is:

1. A method for controlling access to a bus connecting a plurality of slaves to a master in a data network, wherein a slave having information to send transfers a request for permission to send to the master to control access, the method comprising the steps of:

when no slave has permission to send, searching in the master for a request for permission to send information from a slave;

interrupting searching in the master when a request for permission to send is found; and transferring a permission to send only to the slave whose request for permission to send was found;

wherein the permission to send is transferred only as long as the slave transfers the found request for permission to send.

2. The method of claim 1, further comprising the steps of:

interrupting the transfer of the found request for permission to send when the slave has terminated transmission of information;

interrupting the transfer of the permission to send to the slave; and resuming searching for a request for permission to send.

3. The method of claim 2, further comprising the step of interrupting the slave's transmission of information and transfer of the found request for permission to send if the transfer of the permission to send ceases while the slave is sending information.

4. The method of claim 1, further comprising the step of terminating the transfer of the permission to send after a predetermined time.

5. The method of claim 1, further comprising the step of granting priority to certain priority slaves by allowing a request for permission to send from a non-priority slave to be exempted from the search for a request for permission to send.

6. An apparatus for controlling access to a bus connecting a plurality of slaves to a master in a data network, wherein each slave, when having information to send, transfers a first signal indicating a request for permission to send to the master to request access, comprising:

a searching device for searching, when no slave has permission to send, for a first signal transferred from a slave and for interrupting searching and generating a second signal indicating a permission to send when a transferred first signal is found; and a distribution device for transferring the second signal only to the slave whose transferred first signal was found;

wherein the distribution device transfers the second signal to the slave whose transferred first signal was found as long as the slave transfers the transferred first signal.

7. The apparatus of claim 6, wherein the second signal is directly dependent on a corresponding transferred first signal.

8. The apparatus of claim 6, wherein the searching device comprises:

a multiplexer having an output and a plurality of inputs, wherein the inputs receive first signals transferred from the slaves, and the multiplexer is arranged for sequentially connecting one input at a time to the output; and a counter for controlling the multiplexer's sequential connection in pace with a clock signal by counting to a number that corresponds to the number of slaves and thereafter restarting a new counting cycle, wherein the counter is stopped when a first signal appears at the output of the multiplexer.

9. The apparatus of claim 8, wherein the distribution device comprises a demultiplexer having a plurality of outputs and an input to which the output of the multiplexer is connected, wherein the demultiplexer is arranged for sequentially connecting one of the plurality of outputs at a time to the demultiplexer input synchronously with the multiplexer's sequential connection, and the demultiplexer's sequential connection is controlled with the counter that controls the searching device, whereby a signal appearing on the output of the multiplexer is distributed synchronously with the sequential connecting so as to be transferred to the slaves in the form of a second signal.

10. The apparatus of claim 8, further comprising a register having a plurality of cells and a corresponding plurality of gate circuits, wherein every first signal transferred from the slaves is read into a predetermined cell in the register and every cell in the register is connected via a gate circuit to one of the plurality of inputs of the multiplexer.

11. The apparatus of claim 10, wherein the gate circuits are controlled by enable signals for giving priority to certain slaves by allowing first signals corresponding to these slaves to pass through the gate circuits.

12. The apparatus of claim 10, wherein the gate circuits are controlled by enable signals for locking certain slaves out of the data network by preventing first signals corresponding to these slaves from passing through the gate circuits.

13. An apparatus for controlling access to a bus connecting a plurality of slaves to a master in a data network, comprising:

means for searching, when no slave has permission to send, for a request for permission to send information from a slave;

means for transferring a request for permission to send from a slave to the master when the slave has information to send;

means for interrupting searching in the master when a request for permission to send from the slave is found; and means for transferring a permission to send only to the slave whose request for permission to send was found;

wherein permission to send is only given for as long as the transfer of the request for permission to send is maintained by the slave.

* * * * *